April 16, 1940.  L. M. LITTLEFIELD  2,197,077

MACHINE FOR BALANCING TIRES

Filed May 6, 1938

INVENTOR.

Lloyd M. Littlefield

BY Chapin + Neal

ATTORNEYS

Patented Apr. 16, 1940

2,197,077

UNITED STATES PATENT OFFICE 2,197,077

MACHINE FOR BALANCING TIRES

Lloyd M. Littlefield, Springfield, Mass., assignor, by mesne assignments, to United States Rubber Company, New York, N. Y., a corporation of New Jersey Application May 6, 1938, Serial No. 206,497

1 Claim. (Cl. 51—141)

This invention relates to a method of balancing pneumatic tires and to a mechanism for carrying out the method.

Because of the relatively high speeds at which automobiles are operated it is desirable that the tire casings with which they are equipped be circumferentially balanced. In many instances otherwise perfect casings are found on inspection to be slightly out of balance and it has heretofore been the usual practice to add weight to the "light" portion of the casing by applying a patch coating of rubber or other material to the inside of the casing to a sufficient thickness to bring the tire into substantial balance. This method is undesirable from several viewpoints. The material applied to the casing tends to flake off when the tire is in use and subject to constant flexing. Furthermore, it is difficult to distribute the material properly and a material which can be so applied is relatively light in weight so that if the degree of off-balance is at all substantial an excessive amount of material has to be applied which increases the tendency to flake off.

It is the object of my invention to overcome these difficulties and thereby substantially increase the possible range of adjustment, secure a permanent balance, and at the same time secure economies in operation.

According to my invention I remove the excess of material from the heavy side of the tire, rather than attempting to add weight to the light side. Furthermore, I remove the material from the tread, which is the densest rubber element of the tire, so that a minimum of material is removed.

In the accompanying drawing which illustrates one embodiment of my invention—

Figure 1:
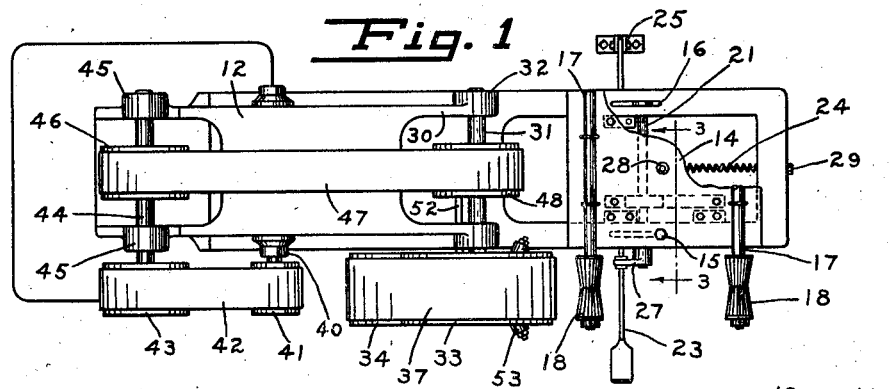
Fig. 1 is a plan view of a machine for carrying out my method.
Figure 3:
Fig. 3 is a detail sectional view substantially on line 3—3 of Fig. 1.

Referring to the drawing, the frame is shown as comprising a base portion 10 provided at one end with an upright 11, upon the upper end of which is mounted a cantilever member 12.

A carriage, in the form of a plate 14, is slidably mounted for limited reciprocation on base 10 by means of bolts 15 secured to the plate and riding in slots 16 formed in base member 10.

Plate 14 carries a pair of spaced parallel shafts 17 extending outwardly from one side of the plate, the outer ends of the shafts being provided with freely rotatable V-shaped rolls 18 upon which the tire casing is supported. Plate 14 is reciprocated by means of a rack 19 secured to the under side of the plate and engaged by a pinion 20 secured on a rock-shaft 21 journaled in bearings 22 formed in the sides of base member 10. Shaft 21 is adapted to be rocked in its bearings by means of a foot treadle 23 pivoted at one end to the floor as at 25 and connected by an adjustable link 26 to a crank 27 secured to shaft 21. A spring 24 connected to the plate 14 at 28 and to the base 10 at 29 tends to keep the plate in retracted position.

The outer end of cantilever 12 is forked as at 30 and a shaft 31 is journaled, as at 32, in the ends of the fork. Shaft 31 is provided outwardly of the frame with a pulley 33 in alignment with an idle pulley 34 mounted on a stub shaft 35 secured in base member 10. Pulleys 33 and 34 are positioned in the plane of the tire supporting rolls 18 and carry an endless belt 37 which is provided on its outer surface with an abrasive material such as emery or the like.

Belt 37 is driven from a motor 40 mounted on base 10 and provided with a pulley 41 connected by belt 42 to a pulley 43 secured to a countershaft 44 mounted in spaced bearings 45 formed at the fixed end of cantilever 12. Shaft 44 is provided with a pulley 46 connected by a belt 47 to a pulley 48 secured to shaft 31 intermediate bearings 32.

An upright 50 is mounted on base 10 and carries a rotatable screw 51 upon which is threaded a bracket 52 extending between the runs of belt 37. The free end of bracket 52 carries a pair of rolls 53 pivoted for angular adjustment as at 54 to the bracket. Screw 51 is adapted to be rotated to raise or lower bracket 52 by means of a crank handle 55 secured to the upper end of the screw.

Figure 2:
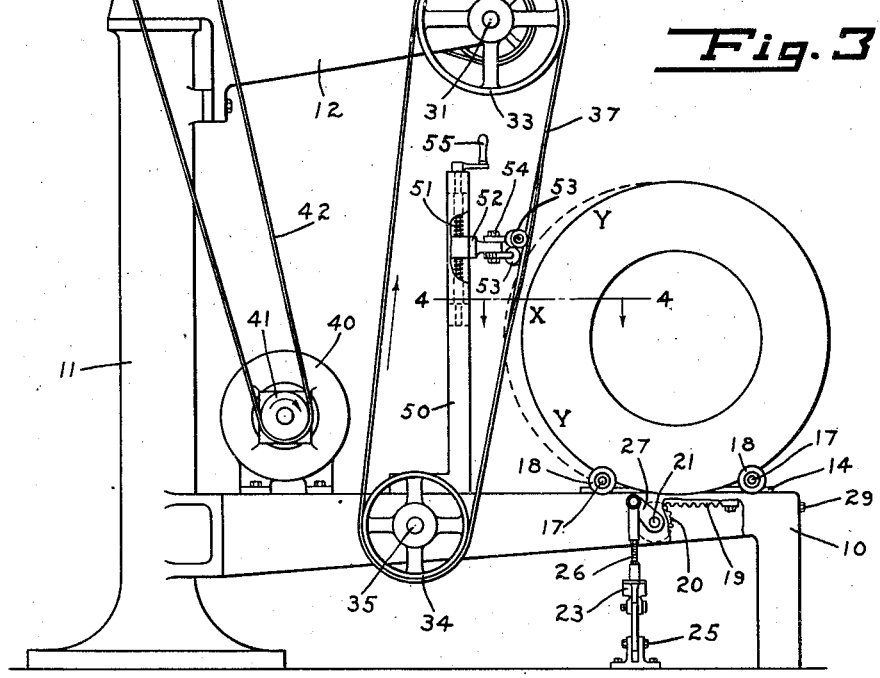
Fig. 2 is a side elevational view of the machine of Fig. 1.
Figure 4:
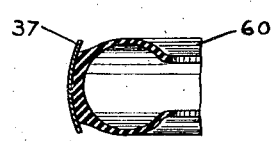
Fig. 4 is a detail sectional view substantially on line 4—4 of Fig. 2.

In operation a tire 60 is placed in a vertical position on rollers 18, the motor 40 being in operation to drive belt 37 in the direction of the arrow in Fig. 2. The operator then depresses treadle 23 to move the tread portion of the tire against the abrasive surface of the belt. The "center" of overweight has been previously marked on the tire as by a chalk mark or otherwise, as at X, and the operator directs that point of the tread against the belt, and by hand rocks the tire back and forth, say between the points y—y, thus distributing the removal of the material in diminishing amounts over a substantial arc on each side of the center of overweight. As shown in Fig. 4, the belt flexes to conform to the surface of the tread, and by means of the adjustment of angular rolls 53, which are preferably positioned slightly above the point of tangency of the tire and belt, the pressure of the belt may be made substantially uniform across the tread.

By proper manipulation of the tire the tire is brought into balance without making any noticeable alteration in its appearance and the balanced condition is permanent.

A further advantage of my machine and method is that the balancing operation can be combined with the usual buffing operation to remove mold marks and overflow fins from the tread, the latter being accomplished by simply giving the tire one or more complete rotations in contact with belt 37, either before or after the balancing of the tire has been carried out.

While I have illustrated my invention as applied to the balancing of a pneumatic tire, it will be understood that it is equally applicable to other types of tires such as solid or cushion tires.

What I claim is:

A machine for removing controlled amounts of material from the tread of a tire which comprises a pair of spaced pulleys, an endless belt having an abrasive outer surface trained around the pulleys, means to drive the belt, a carriage provided with spaced, freely rotatable rollers adapted to support a tire in upright position, and means to reciprocate the carriage toward and from the belt to move a tire supported thereon into and out of contact with a run of the belt at a point intermediate said pulleys, and a pair of angularly adjustable rolls mounted behind the tire engaging run of the belt to impart a predetermined degree of transverse curvature to the tire contacting portion of the belt.

LLOYD M. LITTLEFIELD.